(12) United States Patent
Weng et al.

(10) Patent No.: US 11,891,006 B2
(45) Date of Patent: Feb. 6, 2024

(54) DRIVER AIRBAG WITH EXTENSION ADJACENT REAR PANEL

(71) Applicant: Ford Global Technologies, LLC, Dearborn, MI (US)

(72) Inventors: Tzu-Chen Weng, Troy, MI (US); Srinivas Reddy Malapati, Novi, MI (US); Zhibing Deng, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 602 days.

(21) Appl. No.: 16/800,817

(22) Filed: Feb. 25, 2020

(65) Prior Publication Data
US 2021/0261080 A1 Aug. 26, 2021

(51) Int. Cl.
*B60R 21/203* (2006.01)
*B60R 21/2338* (2011.01)
*B60R 21/231* (2011.01)

(52) U.S. Cl.
CPC ........ *B60R 21/2035* (2013.01); *B60R 21/203* (2013.01); *B60R 21/231* (2013.01); *B60R 21/2338* (2013.01); *B60R 2021/23382* (2013.01)

(58) Field of Classification Search
CPC .. B60R 21/2035; B60R 21/203; B60R 21/231
See application file for complete search history.

(56) References Cited

U.S. PATENT DOCUMENTS

| | | | | |
|---|---|---|---|---|
| 5,529,337 A | * | 6/1996 | Takeda | B60R 21/233 280/729 |
| 6,164,696 A | * | 12/2000 | Ellerbrok | B60R 21/2342 280/743.2 |
| 6,734,125 B2 | | 5/2004 | Veiga | |

(Continued)

FOREIGN PATENT DOCUMENTS

| | | |
|---|---|---|
| DE | 19958152 B4 | 10/2007 |
| DE | 102008049504 A1 | 4/2010 |

(Continued)

OTHER PUBLICATIONS

JP-2008094224-A (machine translation) (Year: 2008).*

*Primary Examiner* — Jason D Shanske
*Assistant Examiner* — Joselynn Y Sliteris
(74) *Attorney, Agent, or Firm* — Frank A. MacKenzie; Bejin Bieneman PLC

(57) ABSTRACT

An assembly for a vehicle includes a steering wheel. The assembly includes an airbag inflatable to an inflated position. The airbag has a main chamber supported by the steering wheel. The main chamber in the inflated position has a rear panel facing the steering wheel, an impact panel opposite the rear panel, and an outermost periphery between the impact panel and the rear panel. The airbag includes an extension having a first end and a terminal end. The extension extends from the first end to the terminal end adjacent the rear panel of the main chamber. The first end extends from the outermost periphery and the rear panel and the terminal end is connected to the rear panel. The airbag has an inflation chamber extending from the main chamber to the terminal end through the first end of the extension.

20 Claims, 7 Drawing Sheets

(56) References Cited

U.S. PATENT DOCUMENTS

| | | | | |
|---|---|---|---|---|
| 6,962,366 B2* | 11/2005 | Fukuda | ................. | B60R 21/201 |
| | | | | 280/743.1 |
| 7,025,376 B2* | 4/2006 | Dominissini | ......... | B60R 21/233 |
| | | | | 280/743.2 |
| 7,152,878 B2* | 12/2006 | Kai | ....................... | B60R 21/231 |
| | | | | 280/743.2 |
| 7,210,701 B2* | 5/2007 | Meissner | .............. | B60R 21/231 |
| | | | | 280/743.1 |
| 7,441,799 B2* | 10/2008 | Enders | .................... | B62D 1/06 |
| | | | | 280/731 |
| 7,686,331 B2 | 3/2010 | Li et al. | | |
| 7,828,327 B2* | 11/2010 | Kai | .................... | B60R 21/2338 |
| | | | | 280/739 |
| 8,991,857 B2* | 3/2015 | Jacqmarcq | ........... | B60R 21/233 |
| | | | | 280/743.1 |
| 9,321,421 B2* | 4/2016 | Fukawatase | ......... | B60R 21/231 |
| 9,333,939 B2* | 5/2016 | Koshikawa | ........... | B60R 21/203 |
| 9,637,081 B2 | 5/2017 | Ryan et al. | | |
| 9,845,069 B1* | 12/2017 | Owen | .................. | B60R 21/205 |
| 10,166,946 B2* | 1/2019 | Sumiya | ................ | B60R 21/205 |
| 10,493,941 B2* | 12/2019 | Szawarski | ........... | B60R 21/2334 |
| 10,507,781 B2* | 12/2019 | Nakanishi | ................ | B62D 1/04 |
| 10,507,784 B2* | 12/2019 | Nakanishi | ................ | B62D 1/04 |
| 10,507,785 B2* | 12/2019 | Ishiguro | ................ | B60R 21/2338 |
| 10,710,542 B2* | 7/2020 | Aranzulla | ............. | B60R 21/231 |
| 10,752,200 B2* | 8/2020 | Ishiguro | ................ | B60R 21/203 |
| 10,836,343 B2* | 11/2020 | Nakajima | ............. | B60R 21/205 |
| 11,260,817 B2* | 3/2022 | Takahashi | ............. | B60R 21/203 |
| 2006/0232050 A1* | 10/2006 | Kumagai | ............... | B60R 21/231 |
| | | | | 280/732 |
| 2011/0210533 A1* | 9/2011 | Adachi | ............... | B60R 21/2338 |
| | | | | 280/728.2 |
| 2017/0355341 A1* | 12/2017 | Keyser | .................. | B60R 21/203 |

FOREIGN PATENT DOCUMENTS

| | | | | | |
|---|---|---|---|---|---|
| JP | 01132444 A | * | 5/1989 | ........... | B60R 21/203 |
| JP | 2008094224 A | * | 4/2008 | | |
| KR | 1020120122699 A | * | 11/2012 | ........... | B60R 21/203 |
| WO | WO-2007117182 A1 | * | 10/2007 | ........... | B60R 21/233 |
| WO | WO-2008030144 A1 | * | 3/2008 | ........... | B60R 21/231 |
| WO | WO-2010036162 A1 | * | 4/2010 | ......... | B60R 21/2338 |

* cited by examiner

DRIVER AIRBAG WITH EXTENSION ADJACENT REAR PANEL

BACKGROUND

Vehicles are equipped with airbags. In the event of an impact, an inflator activates and provides inflation medium to the airbags, and the airbags pressurize and act as cushions for occupants during the impact. The airbags are located at various fixed positions in passenger cabins of vehicles. Vehicles typically include a driver airbag mounted in the steering wheel. Upon inflation, a rim of the steering wheel may act as a reaction surface for the driver airbag.

DETAILED DESCRIPTION

Figure 1:
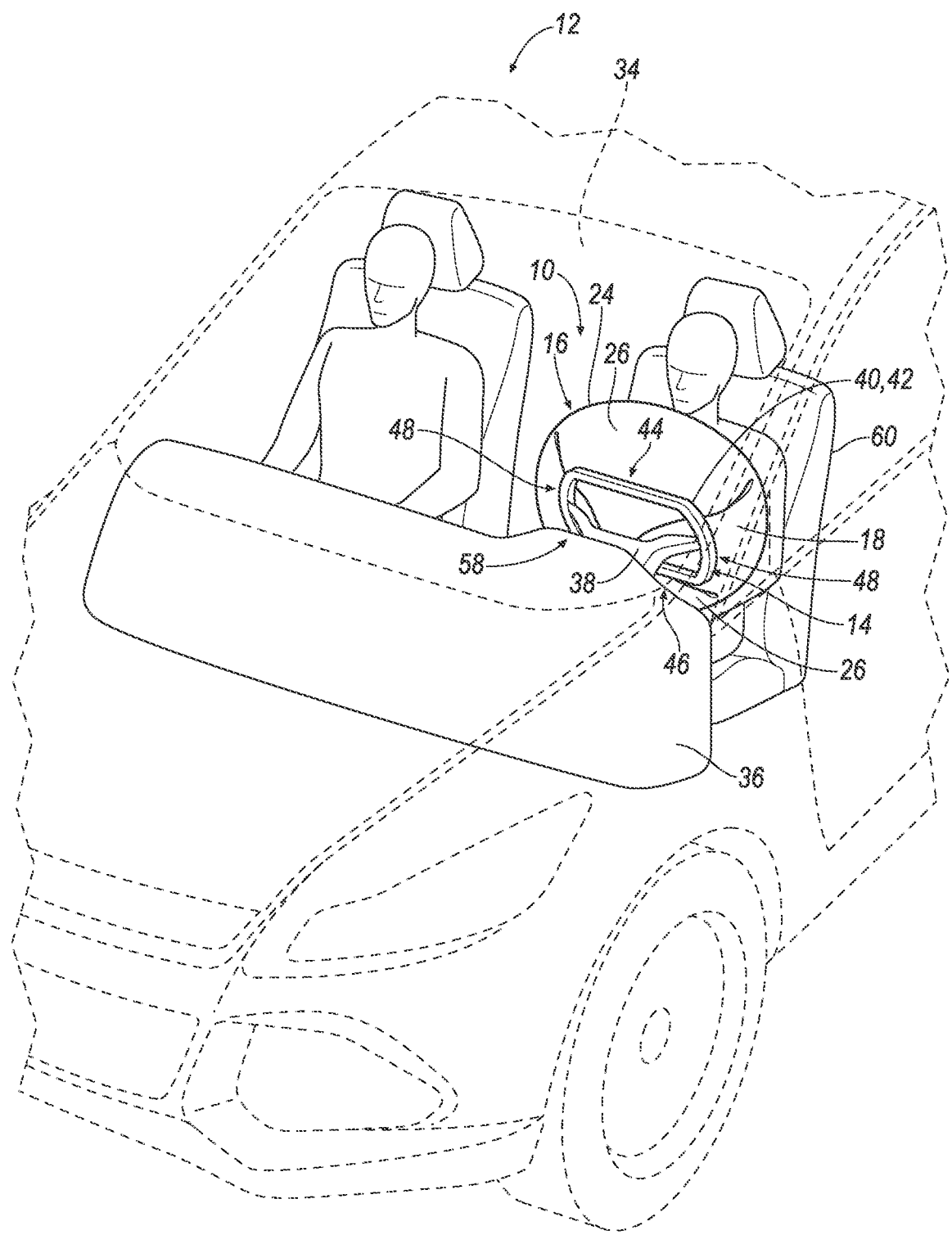
FIG. 1 is a perspective view of a vehicle with an airbag supported by a steering wheel, the airbag in the inflated position.

An assembly includes a steering wheel. The assembly includes an airbag inflatable to an inflated position and having a main chamber supported by the steering wheel. The main chamber in the inflated position has a rear panel facing the steering wheel, an impact panel opposite the rear panel, and an outermost periphery between the impact panel and the rear panel. The airbag having an extension having a first end and a terminal end and extending from the first end to the terminal end adjacent the rear panel of the main chamber, the first end extending from the outermost periphery and the rear panel, and the terminal end being connected to the rear panel. The airbag having an inflation chamber extending from the main chamber to the terminal end through the first end of the extension.

The airbag may include a second extension having a first end and a terminal end and extending from the first end of the second extension to the terminal end of the second extension adjacent the rear panel of the main chamber, the first end of the second extension extending from the outermost periphery and the rear panel, and the terminal end of the second extension being connected to the rear panel.

The steering wheel may include a top and a bottom spaced from the top, the extension being positioned at the top and the second extension being positioned at the bottom.

The extension and second extension may be spaced from each other by 180 degrees.

The extension and the second extension may each extend along less than a quarter of the outermost periphery.

The steering wheel may include a top, the extension being positioned at the top.

The steering wheel may be oblong.

The steering wheel may include a rim having a straight portion, the extension being positioned at the straight portion.

The extension may extend along less than a quarter of the outermost periphery.

The extension may be between the rear panel and the steering wheel when the airbag is in the inflated position.

The extension may abut the steering wheel when the airbag is in the inflated position.

The assembly may include a gap defined between the extension and the rear panel of the airbag, the gap extending along the extension and the rear panel and from the first end to the terminal end of the extension.

The main chamber and the extension may be unitary.

The terminal end of the extension may be connected to the rear panel of the airbag by a stitch.

The airbag may include a tether extending from the terminal end to the rear panel of the airbag.

The assembly may include an airbag housing, the terminal end being directly connected to the airbag housing.

With reference to the Figures, wherein like numerals indicate like parts throughout the several views, an assembly 10 for a vehicle 12 includes a steering wheel 14. The assembly 10 includes an airbag 16 inflatable to an inflated position. The airbag 16 has a main chamber 18 and is supported by the steering wheel 14. The main chamber 18 in the inflated position includes a rear panel 20 facing the steering wheel 14, an impact panel 22 opposite the rear panel 20, and an outermost periphery 24 between the impact panel 22 and the rear panel 20. The airbag 16 has an extension 26 having a first end 28 and a terminal end 30 with the extension 26 extending from the first end 28 to the terminal end 30. The extension 26 extends adjacent the rear panel 20 of the main chamber 18. The first end 28 extends from the outermost periphery 24 and the rear panel 20 and the terminal end 30 are connected to the rear panel 20. The airbag 16 has an inflation chamber 32 extending from the main chamber 18 to the terminal end 30 through the first end 28 of the extension 26.

The extension 26 stiffens the main chamber 18 of the airbag 16 to control kinematics of an occupant during impact with the impact panel 22. Specifically, upon inflation, the extension 26 creates tension in the impact panel 22 at the outermost periphery 24 and extends adjacent the rear panel 20, both of which stiffen the airbag 16 at the outermost periphery 24. By increasing the stiffness at the outermost periphery 24, the extension 26 may eliminate the steering wheel 14 as a reaction surface for the airbag 16. Accordingly, this allows the steering wheel 14 to be of a shape that does not provide a reaction surface for the airbag 16, e.g., a non-circular airbag 16.

The vehicle 12 may be any suitable type of automobile, e.g., a passenger or commercial automobile such as a sedan, a coupe, a truck, a sport utility vehicle, a crossover vehicle, a van, a minivan, a taxi, a bus, etc. The vehicle 12, for example, may be an autonomous vehicle. In other words, the vehicle 12 may be autonomously operated such that the vehicle 12 may be driven without constant attention from a driver, i.e., the vehicle 12 may be self-driving without human input.

The vehicle 12 may define a passenger cabin 34 to house occupants, if any, of the vehicle 12. The passenger cabin 34 may extend across the vehicle 12, i.e., from one side to the other side of the vehicle 12. The passenger cabin 34 includes a front end and a rear end with the front end being in front of the rear end during forward movement of the vehicle 12.

The vehicle 12 may include an instrument panel 36 disposed at a vehicle forward end of the passenger cabin 34. The instrument panel 36 may support vehicle controls, including the steering wheel 14. The instrument panel 36 may extend across the front end of the passenger cabin 34 from one side of the vehicle 12 to the other side of the vehicle 12.

The vehicle 12 includes a steering system (not numbered). The steering system controls the turning of the wheels. The steering system is in communication with and receives input from the steering wheel 14. The steering system may include a rack-and-pinion system with electric power-assisted steering, a steer-by-wire system, as are both known in the art, or any other suitable system. The steering wheel 14 allows an operator to steer the vehicle 12 by transmitting rotation of the steering wheel 14 to movement of a steering rack. The steering system includes a steering column supporting the steering wheel 14.

The steering wheel 14 may be elongated, i.e., longer in one direction than another. In the example shown in the Figures, the steering wheel 14 may be elongated in a cross-vehicle direction when the steering wheel 14 is steered straight, i.e., when the steering wheel 14 is in an orientation such that the vehicle 12 is moving in a generally straight direction.

The steering wheel 14 may include a base 38 and one or more handles 40 connected to the base 38 and spaced from the base 38. The handle(s) 40 may be gripped by a human driver to steer the wheel by rotating the wheel relative to the steering column. The handle 40 may be a rim 42, as shown in the Figures. The rim 42 is endless, e.g., oval, rectangular, rounded rectangular, etc. As other examples, the steering wheel 14 may be rimless. For example, the handle 40 may be paddle. In such an example, the steering wheel 14 may include two paddles spaced from each other in a cross-vehicle direction when the steering wheel 14 is steered straight.

The steering wheel 14 may be oblong, as shown in the Figures. Specifically, the rim 42 may be oblong. In other words, the steering wheel 14, e.g., the rim 42, may be elongated in one direction. In examples in which the rim 42 is oblong, the rim 42 may be oval, rectangular, rounded rectangular, etc.

Figure 2:
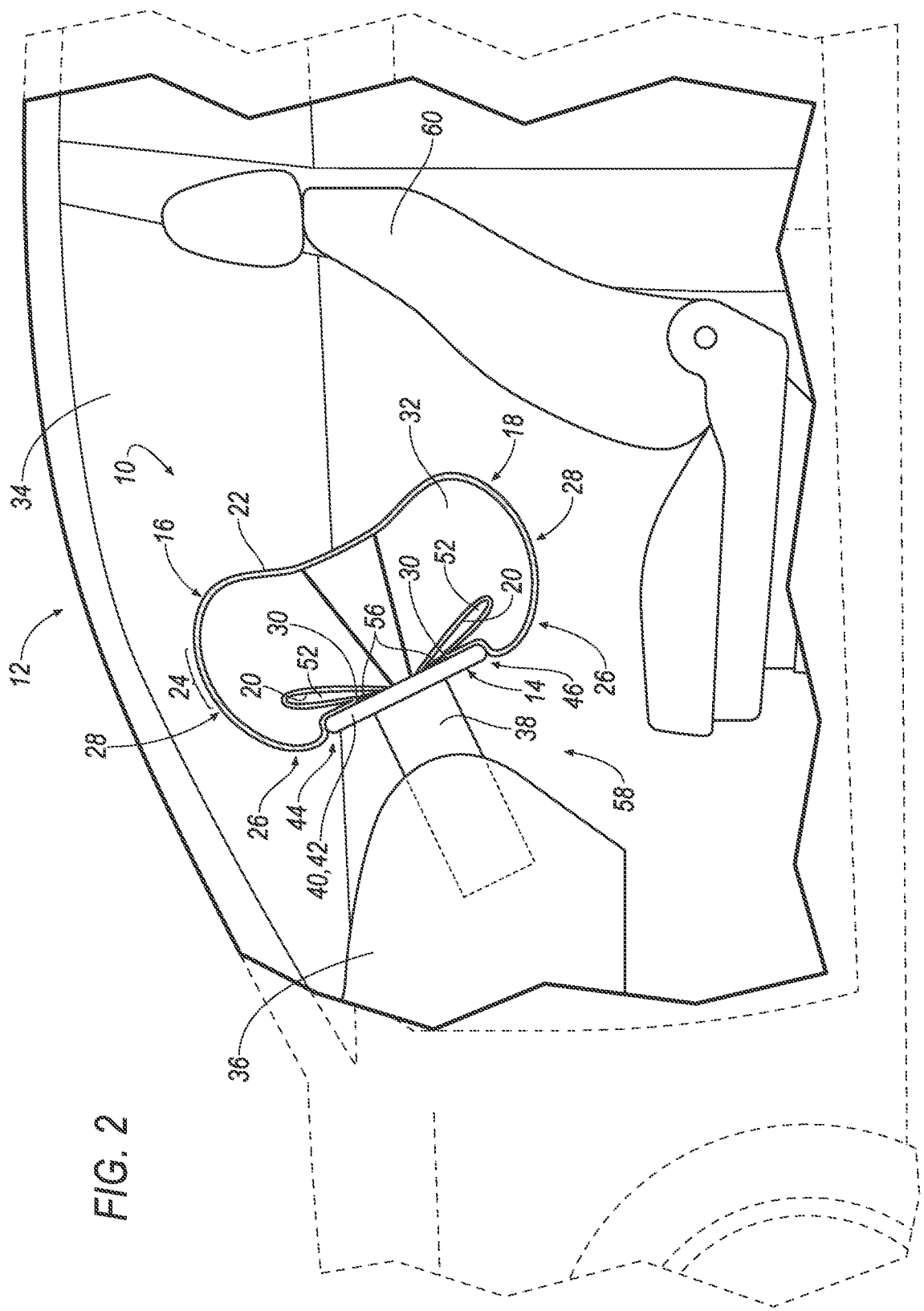
FIG. 2 is a side view of the vehicle with the airbag in the inflated position.

As shown in FIG. 2, the steering wheel 14, e.g., the rim 42, includes a top 44, a bottom 46 spaced from the top 44, and two sides 48 spaced from each other and each extending from the top 44 to the bottom 46. Specifically, the rim 42 may define the top 44, bottom 46, and sides 48 of the steering wheel 14. The top 44 of the steering wheel 14 is above the bottom 46 of the steering wheel 14 when the steering wheel 14 is steered straight.

In examples in which the rim 42 is oblong, the rim 42 may include a straight portion at the top 44 of the steering wheel 14 and/or a straight portion at the bottom 46 of the steering wheel 14. The straight portions may be generally straight and elongated in the cross-vehicle direction. The rim 42 may include curved portions at the sides 48 of the steering wheel 14. In the example shown in the Figures, the rim 42 includes one straight portion at the top 44, one straight portion at the bottom 46, and two curved portions at the sides 48, respectively.

The assembly 10 may include an airbag assembly 58. The airbag assembly 58 may include an airbag housing 50, an inflator (not numbered), and the airbag 16. The airbag 16 may be inflatable from an uninflated position to the inflated position. The inflator and the airbag 16 may be disposed in the housing 50 in the uninflated position. The housing 50 may provide a reaction surface for the airbag 16 in the inflated position. The housing 50 may be supported by the steering wheel 14. The housing 50 may be of any material, e.g., a rigid polymer, a metal, a composite, etc.

The inflator (not shown) is in fluid communication with the airbag 16. The inflator expands the airbag 16 with an inflation medium, such as a gas, to move the airbag 16 from the uninflated position to the inflated position. The inflator may be supported by any suitable component. For example, the inflator may be supported by the housing 50. The inflator may be, for example, a pyrotechnic inflator that ignites a chemical reaction to generate the inflation medium, a stored gas inflator that releases (e.g., by a pyrotechnic valve) stored gas as the inflation medium, or a hybrid. The inflator may be, for example, at least partially in the inflation chamber 32 to deliver inflation medium directly to the inflation chamber 32 or may be connected to the inflation chamber 32 through fill tubes, diffusers, etc.

The airbag 16 may be woven nylon yarn, for example, nylon 6, 6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

Figure 4:
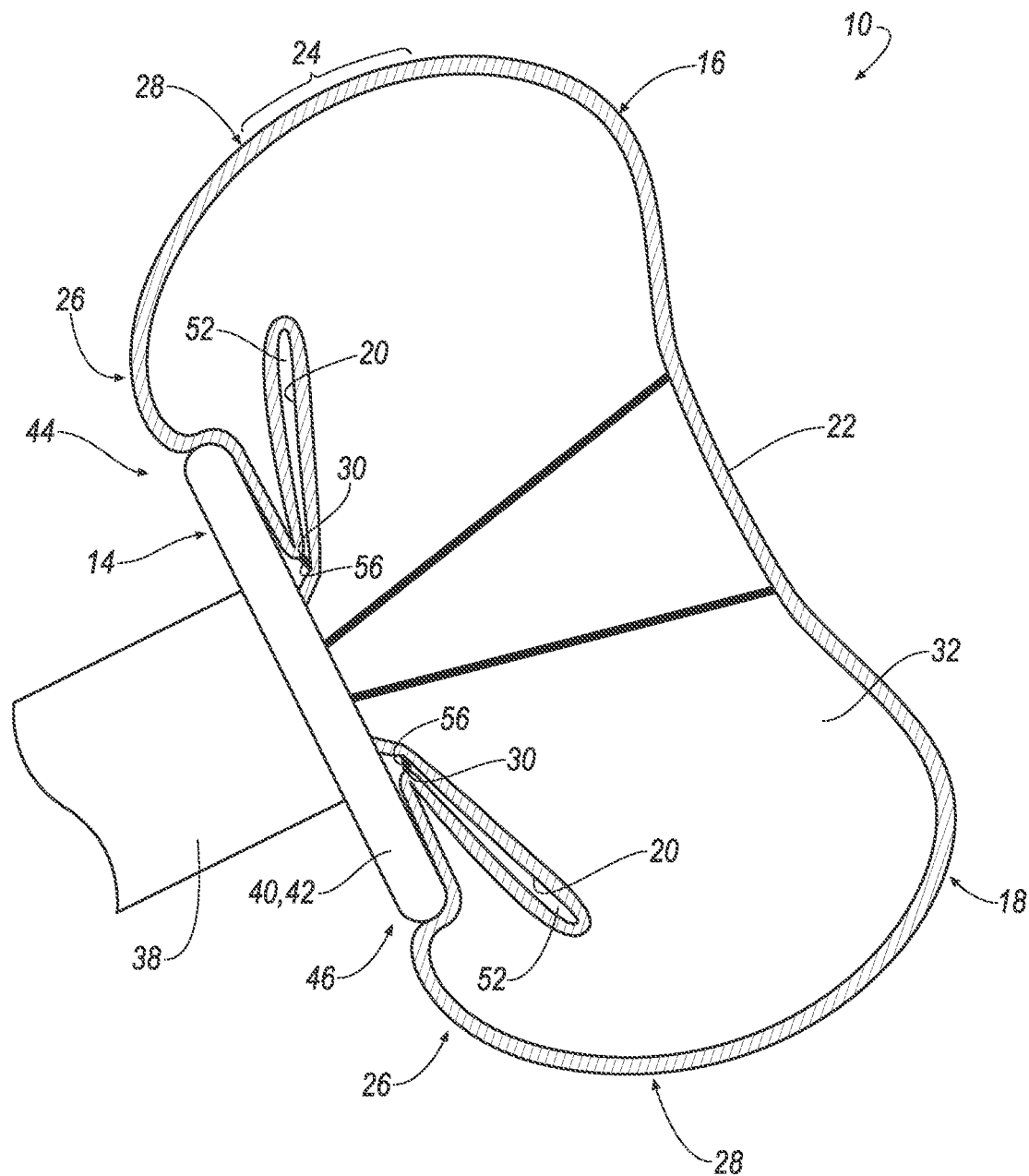
FIG. 4 is a cross-sectional view of the airbag having a pair of extensions, the extensions connecting to a rear panel of the airbag by a tether.
Figure 5:
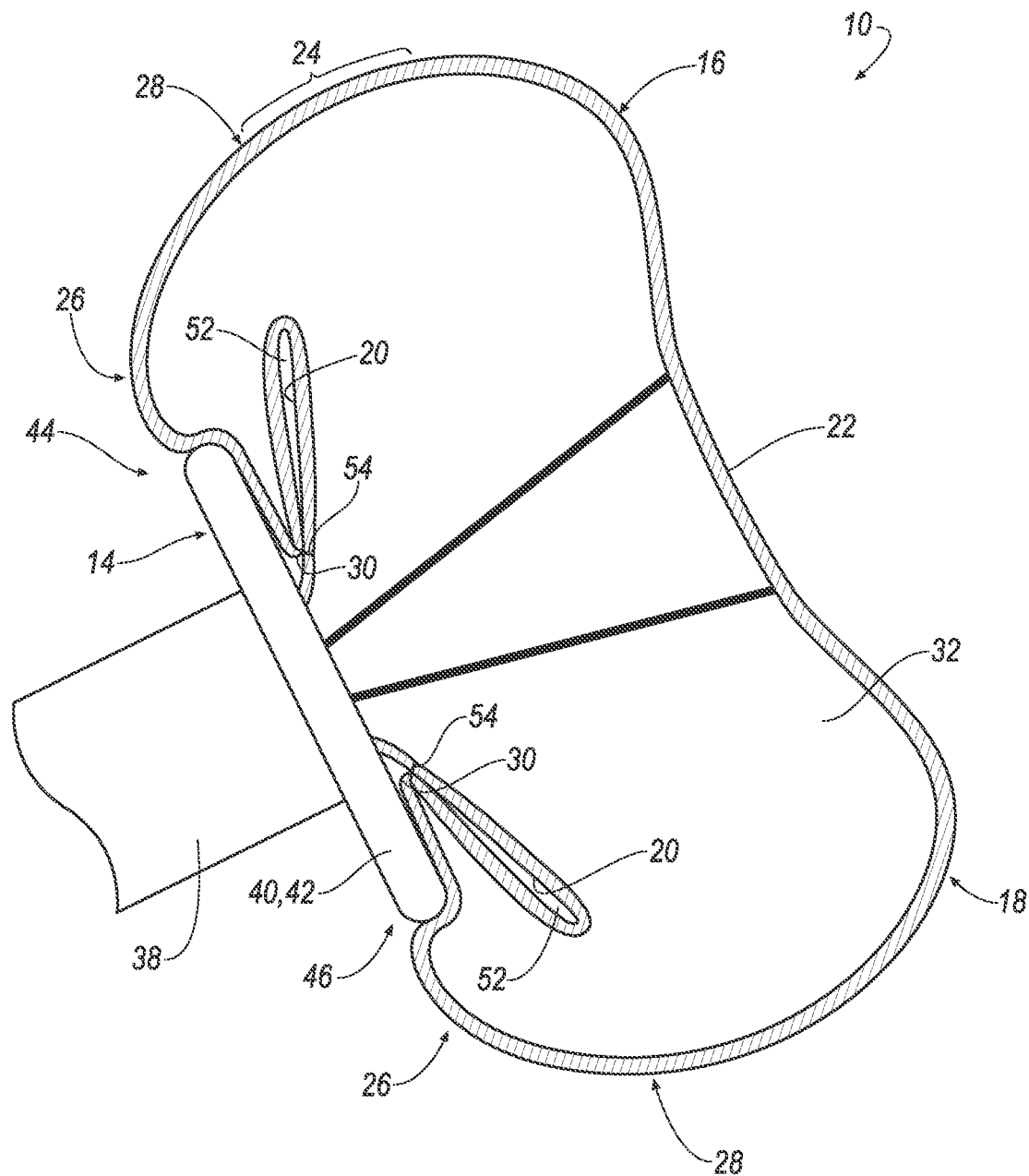
FIG. 5 is a cross-sectional view of the airbag having the pair of extensions connecting to the rear panel of the airbag by a stitch.
Figure 6:
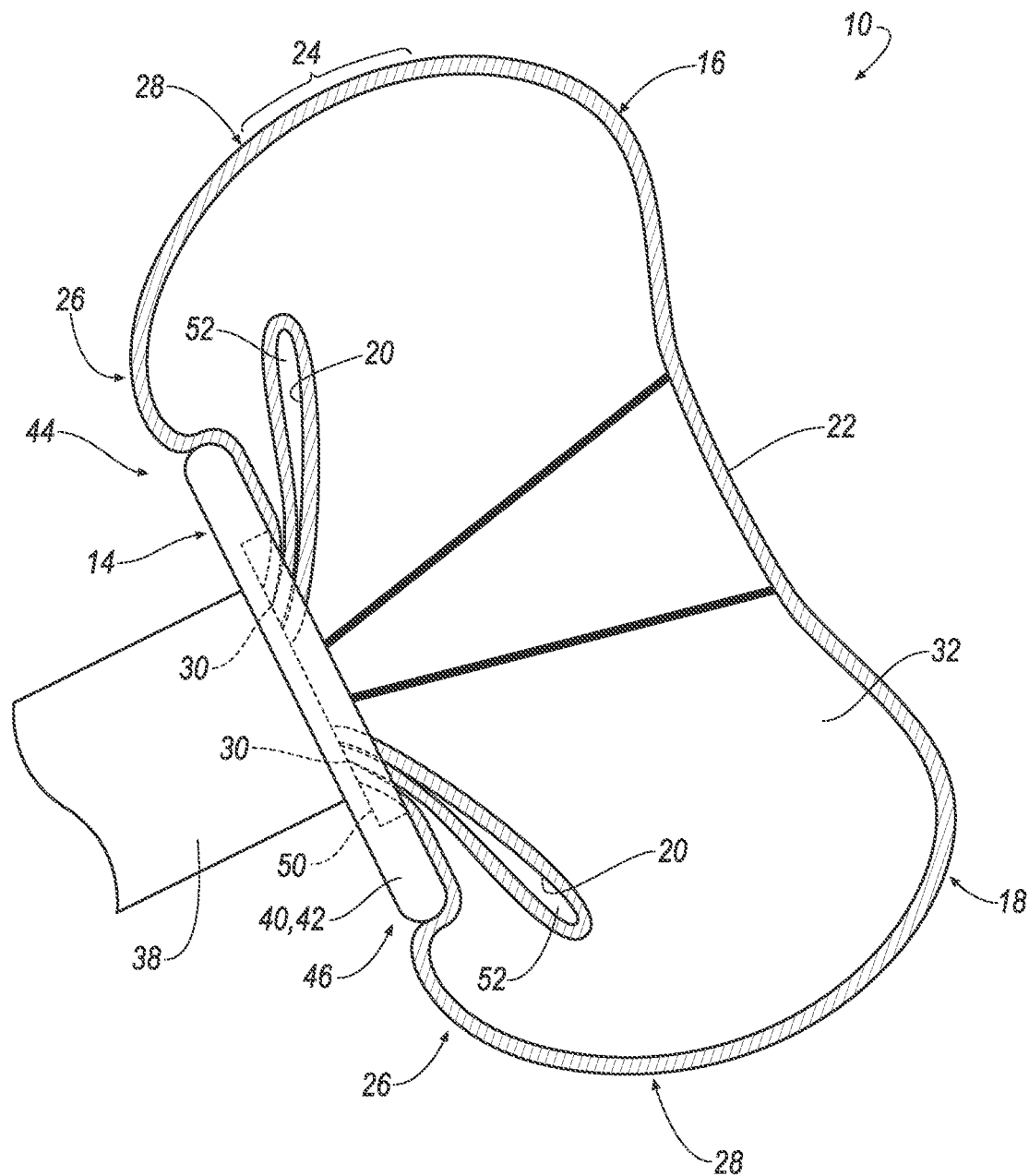
FIG. 6 is a cross-sectional view of the airbag having the pair of extensions connecting to an airbag housing.

With continued reference to FIG. 2 and as shown in FIGS. 4-6, the airbag 16 includes a main chamber 18 supported by the steering wheel 14. The main chamber 18 may be housed in the housing 50 of the airbag assembly 58 when the airbag 16 is in the uninflated position. The main chamber 18 may extend into the passenger cabin 34 toward a driver seat 60 when the airbag 16 is in the inflated position.

The main chamber 18 includes an impact panel 22 and a rear panel 20. When the airbag 16 is in the inflated position, the impact panel 22 faces generally vehicle-rearward and the rear panel 20 faces generally vehicle-forward. When the airbag 16 is in the inflated position, the impact panel 22 faces away from the steering wheel 14 and toward the passenger cabin 34 for impact by an occupant during a vehicle impact that urges the occupant vehicle-forward toward the airbag 16. When the airbag 16 is in the inflated position, the rear panel 20 faces the steering wheel 14.

Figure 3:
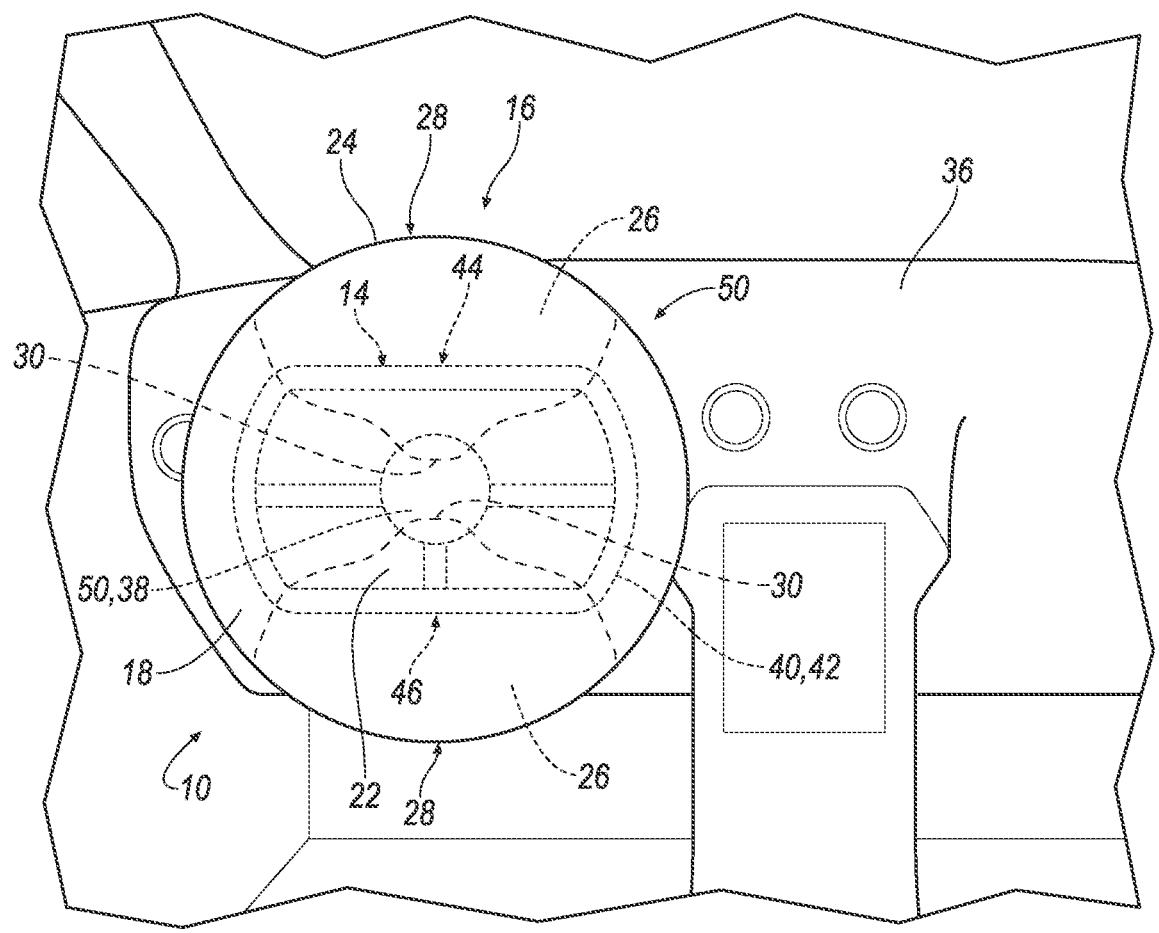
FIG. 3 is a front view of an interior of the vehicle with the airbag in the inflated position.

The main chamber 18 includes an outermost periphery 24 between the impact panel 22 and the rear panel 20. The outermost periphery 24 is endless around the airbag 16 and separates the impact panel 22 and the rear panel 20. The outermost periphery 24 extends along a perimeter of the main chamber 18 when the airbag 16 is in the inflated position as viewed in a vehicle-forward direction. In other words, the outermost periphery 24 is the outer boundary of the main chamber 18 above, below, and on the sides of the main chamber 18 when viewed in the vehicle-forward direction, i.e., the perspective of an occupant seated in the driver seat 60 (specifically, as shown in FIG. 3 with the outermost periphery indicated by element number 24).

The airbag 16 includes at least one extension 26 extending from the main chamber 18. Specifically, the extension 26 extends from the outermost periphery 24 of the main chamber 18, i.e., between the impact panel 22 and the rear panel 20. The extension 26 stiffens the airbag 16 at the outermost periphery 24. Specifically, in the example shown in the Figures, the airbag 16 includes one extension 26 at the top 44 of the steering wheel 14 and one extension 26 at the bottom 46 of the steering wheel 14. These extensions 26 provide stiffness at the outermost periphery 24 of the airbag 16 at both a top and a bottom of the airbag 16. In the examples shown in the Figures, this works in conjunction with the top 44 and the bottom 46 of the steering wheel 14, e.g., the straight portions, to control the kinematics of an occupant impacting the impact panel 22. In the examples in the Figures including more than one extension 26, common numerals are used to identify common features of the extensions 26.

The extension 26 extends from the main chamber 18 adjacent the rear panel 20, i.e., with the lack of any other component between the extension 26 and the main chamber 18. In the inflated position, the extension 26 may abut the rear panel 20, may be spaced from the rear panel 20, or a portion of the extension 26 may abut the rear panel 20 and a portion of the extension 26 may be spaced from the rear panel 20. In other words, the extension 26 extends vehicle-forward of the rear panel 20 of the main chamber 18. Specifically, the extension 26 extends from the outermost periphery 24 of the main chamber 18 and vehicle-forward of the rear panel 20.

In examples in which the extension 26 is spaced from the rear panel 20 or partially spaced from the rear panel 20, the extension 26 defines a gap 52 between the extension 26 and the rear panel 20 when the airbag 16 is in the inflated position. The connection between the terminal end 30 and the rear panel 20 and the curve of the extension 26 from the outermost periphery 24 to the maintain the gap 52 between the extension 26 and the rear panel 20.

The entirety of the extension 26 is spaced from the rear panel 20 of the main chamber 18 to define the gap 52. The gap 52 may extend along the extension 26 and the rear panel 20, i.e., the gap 52 may extend along the entirety of the extension 26 between the extension 26 and the rear panel 20. The gap 52 may extend from the first end 28 to the terminal end 30 of the extension 26, i.e., the extension 26 may be spaced from the rear panel 20 of the main chamber 18 from the first end 28 to the terminal end 30 of the extension 26. The size of the gap 52 may be tuned for design purposes of the airbag 16, i.e., the gap 52 may be smaller or larger depending on the performance requirements of the airbag 16.

The extension 26 may be between the main chamber 18 and the steering wheel 14 when the airbag 16 is in the inflated position. Specifically, the extension 26 may be between the rear panel 20 of the main chamber 18 and the steering wheel 14 when the airbag 16 is in the inflated position. In such an example, the extension 26 may abut the steering wheel 14 when the airbag 16 is in the inflated position. Specifically, the extension 26 may abut both the steering wheel 14 and the rear panel 20. In such an example, the extension 26 is pinched between the steering wheel 14 and the rear panel 20. This both creates tension in the impact panel 22 at the extension 26 and supports the rear panel 20 at the contact between the extension 26 and the rear panel 20.

The extension 26 includes the first end 28 and the terminal end 30 and extends from the first end 28 to the terminal end 30. The extension 26 terminates at the first end 28 and the terminal end 30. The first end 28 extends from the outermost periphery 24 of the main chamber 18 of the airbag 16. In other words, the first end 28 is at the outermost periphery 24 of the main chamber 18.

The terminal end 30 of the extension 26 is connected to the rear panel 20 either directly or indirectly. In the inflated position, the terminal end 30 anchors the extension 26 relative to the rear panel 20. Examples of the connection between the extension 26 and rear panel 20 are shown in FIGS. 4-6. Common numerals are used to identify common features on FIGS. 4-6.

In the example of FIG. 5, the terminal end 30 is directly connected to the rear panel 20, e.g., by a stitch 54. For example, the terminal end 30 may directly connect to the rear panel 20 by stitching, adhesive, ultrasonic welding, etc.

In the example shown in FIG. 4 and the example shown in FIG. 6, the terminal end 30 is indirectly connected to the rear panel 20. Specifically, in FIG. 4, the airbag 16 includes a tether 56 extending from the terminal end 30 to the rear panel 20. The tether 56 may be of the same material of the main chamber 18 or may be of a different type of material. The tether 56 may be of any suitable length to accomplish the desired positioning of the terminal end 30 relative to the rear panel 20.

FIG. 6 shows another example of the terminal end 30 indirectly connected to the rear panel 20. Specifically, the terminal end 30 is connected to the housing 50 of the airbag assembly 58. In such an example, the housing 50 of the airbag assembly 58 is connected to the rear panel 20 and the terminal end 30 to provide the indirect connection between the terminal end 30 and the rear panel 20. In other words, the terminal end 30 anchors the extension 26 relative to the rear panel 20 through the housing 50, i.e., the terminal end 30 is fixed to the housing 50 and the rear panel 20 is fixed to the housing 50, thus anchoring the terminal end 30 and the rear panel 20. As another example of an indirect connection between the terminal end 30 and the rear panel 20, the example of FIG. 6 may include the tether 56 connected to the terminal end 30 and to the housing 50 of the airbag assembly 58. In such an example, the housing 50 of the airbag assembly 58 is connected to the rear panel 20 and the tether 56 to provide the indirection connection between the terminal end 30 and the rear panel 20.

The airbag 16 has an inflation chamber 32 extending in the extension 26 from the main chamber 18 to the terminal end 30 of the extension 26. In other words, the main chamber 18 and the extension 26 share the inflation chamber 32. The inflation chamber 32 extends from the main chamber 18, through the first end 28 of the extension 26, to the terminal end 30 of the extension 26. Inflatable medium from the inflator fills the inflation chamber 32 when the inflator is actuated to inflate the main chamber 18 and the extension 26. The terminal end 30 is closed so that inflation medium does not escape through the terminal end 30.

The first end 28 may extend along a portion of the outermost periphery 24, i.e., less than all of the outermost periphery 24. In the example show in the figures, the first end 28 of the extension 26 may extend along less than a quarter of the outermost periphery 24.

In examples including two extensions 26, the extensions 26 may be spaced from each other by 180 degrees, e.g., one extension 26 may be positioned at the top 44 of the steering wheel 14 and the other extension 26 may be positioned at the bottom 46 of the steering wheel 14. Specifically, a center of one of the extensions 26 along the periphery is spaced 180 degrees from a center of the other of the extensions 26 along the periphery.

The extension 26 may be connected to the main chamber 18 in any suitable manner such that the extension 26 remains as a unit with main chamber 18 during inflation, i.e., the extension 26 and the main chamber 18 do not separate from one another. As an example, the extension 26 may be connected to the main chamber 18 with stitching, adhesive, ultrasonic welding, etc. In another example, the main chamber 18 and the extension 26 may be unitary, i.e., a single, uniform piece of material with no seams, joints, fasteners, or adhesives holds the main chamber 18 and the extension 26 together. In such an example, the main chamber 18 and the extension 26 may be one-piece woven.

Figure 7:
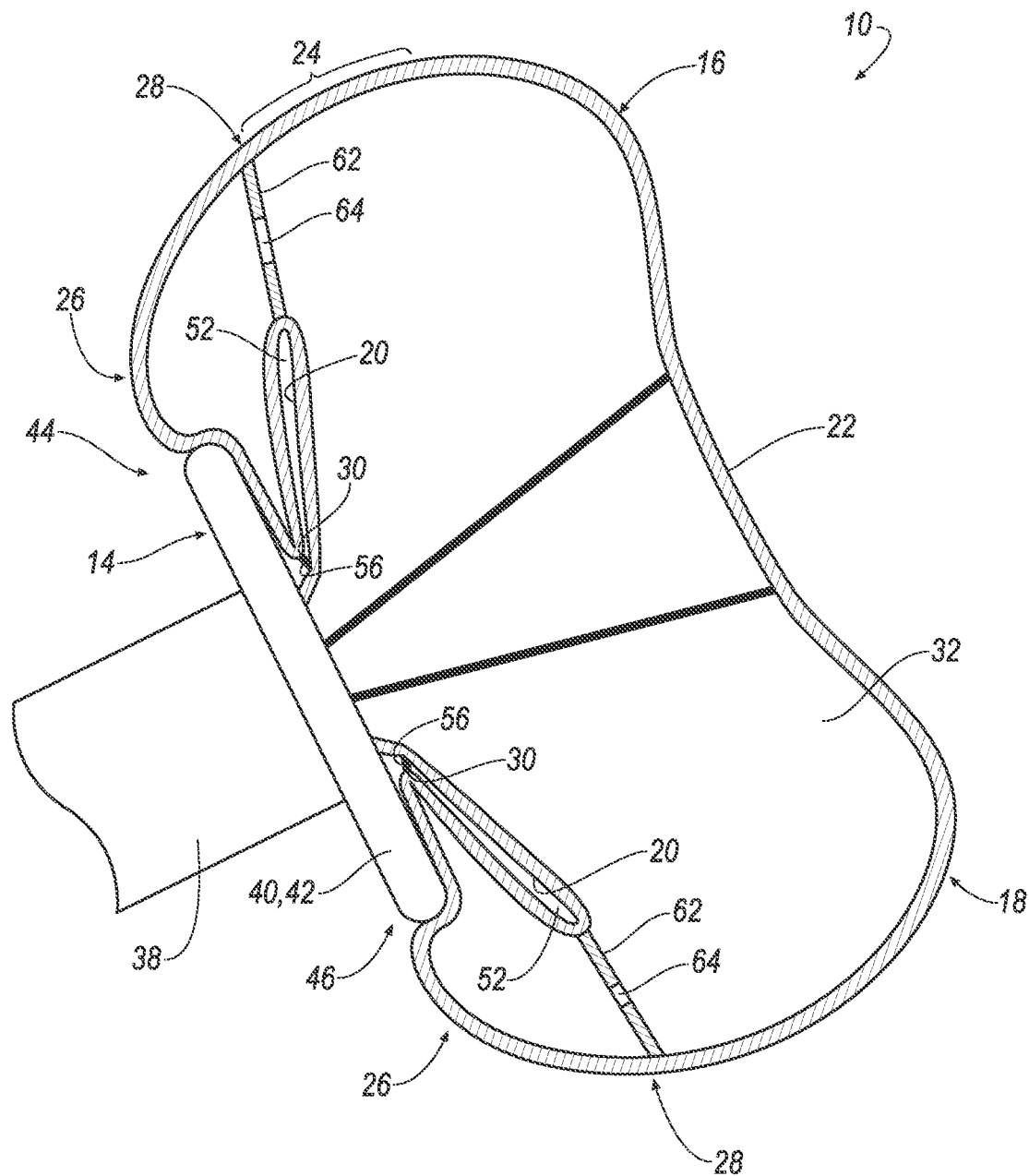
FIG. 7 is a cross-sectional view of another example of the airbag including baffles between the main chamber and the extensions.

With reference to FIG. 7, the airbag 16 may include a baffle 62 between the main chamber 18 and the extension 26. The baffle 62 may extend along the first end 28 of the extension 26. The baffle 62 may extend from the outermost periphery 24 to the rear panel 20 along the first end 28 of the extension 26. The baffle 62 is in the inflation chamber 32 of the airbag 16. The baffle 62 may include at least one opening 64 extending between the main chamber 18 and the extension 26 to allow inflation medium to flow between the main chamber 18 and the extension 26. The baffle 62 allows the pressure of the main chamber 18 and the extension 26 to be tuned based on design factors for the airbag 16. The pressure in the extension 26 may be designed based on the size of the opening 64 (i.e., the size of the opening 64 may be tuned) and based on design factors for the airbag 16, e.g., angle of the steering column, driver seating position, etc.

In examples including two extensions 26, the opening 64 in the baffle 62 at the extension 26 positioned the top 44 of the steering wheel 14 may be larger than the opening 64 in the baffle 62 at the extension 26 positioned at the bottom 46 of the steering wheel 14. The larger opening 64 may allow more inflation medium to flow into the extension 26 positioned at the top 44 of the steering wheel 14 than into the extension 26 positioned at the bottom 46 of the steering wheel 14. A greater amount of inflation medium in the extension 26 positioned at the top 44 of the steering wheel 14 allows the pressure to be greater than the pressure in the extension 26 positioned at the bottom 46 of the steering wheel 14.

As the airbag 16 inflates from the uninflated position to the inflated position, the inflation medium fills the main chamber 18 of the airbag 16. The inflation medium from the main chamber 18 of the airbag 16 flows through the first end 28 of the extension 26 into the extension 26 to fill the extension 26 from the first end 28 to the terminal end 30. In examples including two extensions 26, the inflation medium from the main chamber 18 of the airbag 16 flows through the first end 28 of both the extension 26 and the second extension 26 to fill both the extension 26 and the second extension 26 from the first ends 28 to the terminal ends 30. In the inflated position, tension may extend from the impact panel 22, over the outermost periphery 24, and onto the extension 26. The tension provides further support to the impact panel 22 to control the kinematics of an occupant in the event of an impact to the vehicle 12, i.e., the tension may provide stiffness to the impact panel 22 to control the kinematics of an occupant. In addition to the tension extending over the outermost periphery 24, the extension 26 provides a backing for the main chamber 18 against the steering wheel 14 when the airbag 16 is in the inflated position. Accordingly, this allows the steering wheel 14 to be of a shape that does not provide a reaction surface for the airbag 16, e.g., a non-circular airbag 16.

The vehicle 12 may include a computer and a plurality of impact sensors in communication with the computer. The impact sensors are programmed to detect an impact to the vehicle 12. The impact sensors may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensors may be located at numerous points in or on the vehicle 12.

The communication network includes hardware, such as a communication bus, for facilitating communication among vehicle components. The communication network may facilitate wired or wireless communication among the vehicle components in accordance with a number of communication protocols such as controller area network (CAN), Ethernet, WiFi, Local Interconnect Network (LIN), and/or other wired or wireless mechanisms.

The computer, implemented via circuits, chips, or other electronic components, is included in the vehicle control system for carrying out various operations, including as described herein. The computer is a computing device that generally includes a processor and a memory, the memory including one or more forms of computer-readable media and storing instructions executable by the processor for performing various operations, including as disclosed herein. The memory of the computer further generally stores remote data received via various communications mechanisms; e.g., the computer is generally configured for communications on a controller area network (CAN) bus or the like, and/or for using other wired or wireless protocols, e.g., Bluetooth, etc. The computer may also have a connection to an onboard diagnostics connector (OBD-II). Via a communication network using Ethernet, WiFi, the CAN bus, Local Interconnect Network (LIN), and/or other wired or wireless mechanisms, the computer may transmit messages to various devices in the vehicle 12 and/or receive messages from the various devices, e.g., controllers, actuators, sensors, etc., as discussed herein. For example, the computer may receive data from vehicle sensors.

In the event of an impact, the impact sensors may detect the impact and transmit a signal through the communications network to the computer. The computer may transmit a signal through the communications network to the inflator. The inflator may discharge and inflate the airbag 16 to the inflated position.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly comprising:
   a steering wheel;
   an airbag inflatable to an inflated position and having a main chamber supported by the steering wheel;
   the main chamber in the inflated position having a rear panel facing the steering wheel, an impact panel opposite the rear panel, and an outermost periphery between the impact panel and the rear panel;
   the airbag having an extension having a first end and a terminal end and extending from the first end to the terminal end adjacent the rear panel of the main chamber between the main chamber and the steering wheel when the airbag is in the inflated position, the first end extending from the outermost periphery and the rear panel, and the terminal end being connected to the rear panel;
   the extension being between the rear panel and the steering wheel when the airbag is in the inflated position; and
   the airbag having an inflation chamber extending from the main chamber to the terminal end through the first end of the extension, the inflation chamber being between the steering wheel and the rear panel.

2. The assembly of claim 1, wherein the airbag includes a second extension having a first end and a terminal end and extending from the first end of the second extension to the terminal end of the second extension adjacent the rear panel of the main chamber between the main chamber and the steering wheel when the airbag is in the inflated position, the first end of the second extension extending from the outermost periphery and the rear panel, and the terminal end of the second extension being connected to the rear panel.

3. The assembly of claim 2, wherein the steering wheel includes a top and a bottom spaced from the top, the extension being positioned at the top and the second extension being positioned at the bottom.

4. The assembly of claim 2, wherein the extension and second extension are spaced from each other by 180 degrees.

5. The assembly of claim 2, wherein the extension and the second extension each extend along less than a quarter of the outermost periphery.

6. The assembly of claim 2, wherein the second extension is between the rear panel and the steering wheel when the airbag is in the inflated position.

7. The assembly of claim 1, wherein the steering wheel includes a top, the extension being positioned at the top.

8. The assembly of claim 1, wherein the steering wheel is oblong.

9. The assembly of claim 1, wherein the steering wheel includes a rim having a straight portion, the extension being positioned at the straight portion.

10. The assembly of claim 1, wherein the extension extends along less than a quarter of the outermost periphery.

11. The assembly of claim 1, wherein the extension abuts the steering wheel when the airbag is in the inflated position.

12. The assembly of claim 1, further comprising a gap defined between the extension and the rear panel of the airbag, the gap extending along the extension and the rear panel and the gap extending from the first end to the terminal end of the extension.

13. The assembly of claim 1, wherein the main chamber and the extension are unitary.

14. The assembly of claim 1, wherein the terminal end of the extension is connected to the rear panel of the airbag by a stitch.

15. The assembly of claim 1, wherein the airbag includes a tether extending from the terminal end to the rear panel of the airbag.

16. The assembly of claim 1, further comprising an airbag housing, the terminal end being directly connected to the airbag housing.

17. The assembly of claim 1, wherein the extension curves from the outermost periphery to the terminal end.

18. The assembly of claim 1, wherein the terminal end of the extension is between the rear panel and the steering wheel.

19. The assembly of claim 1, wherein the extension is between the outermost periphery and the steering wheel.

20. The assembly of claim 1, wherein the extension includes a panel extending along the rear panel between the rear panel and the steering wheel when the airbag is in the inflated position.

* * * * *